United States Patent [19]

Cimini et al.

[11] Patent Number: 5,624,964
[45] Date of Patent: Apr. 29, 1997

[54] INTEGRATION OF STEAM REFORMING UNIT AND COGENERATION POWER PLANT

[75] Inventors: Ronald J. Cimini, Sewell; David O. Marler, Deptford, both of N.J.; Reuel Shinnar, Great Neck, N.Y.; Gerald J. Teitman, Vienna, Va.

[73] Assignee: Mobil Oil Corporation, Fairfax, Va.

[21] Appl. No.: 471,976

[22] Filed: Jun. 6, 1995

[51] Int. Cl.$^6$ .................................................. C07C 27/06
[52] U.S. Cl. ........................................ 518/704; 518/707
[58] Field of Search ................................... 518/702, 704

[56] References Cited

U.S. PATENT DOCUMENTS

| | | |
|---|---|---|
| 2,783,133 | 2/1957 | Eastwood . |
| 3,397,962 | 8/1968 | Squires . |
| 3,524,819 | 8/1970 | Guerrieri . |
| 3,573,224 | 3/1971 | Streizoff et al. . |
| 5,160,456 | 11/1992 | Lahn et al. . |
| 5,360,777 | 11/1994 | Davis et al. . |

OTHER PUBLICATIONS

A.R. Brun–Tsekhovoi et al., "Process Of Technical Hydrogen Production With Heat Carrier Circulation", *Eighth World Petroleum Congress*, Applied Science Publishers, Ltd., London 1980, pp. 101–109.

S.-I Wang, "Careful Design Considerations Can Optimize H$_2$/CO Production", *Oil & Gas Journal*, Nov. 1, 1982, Technology, pp. 55–62.

M.A. Hossain, "Best Conditions to Make Syngas", *Hydrocarbon Processing*, May 1988, pp. 76–A – 76–C.

*Primary Examiner*—Samuel Barts
*Attorney, Agent, or Firm*—Robert B. Furr

[57] ABSTRACT

A process for integration of a steam reforming unit and a cogeneration power plant in which said steam reforming unit comprises two communicating fluid beds; the first fluid bed comprising a reformer containing catalyst and which is used to react steam and light hydrocarbons at conditions sufficient to produce a mixture comprising synthesis gas hydrogen, carbon monoxide, and carbon dioxide, the second fluid bed comprising a combustor-regenerator which receives spent catalyst from the first fluid bed and which provides heat to heat the catalyst and balance the reaction endotherm, by combusting fuel gas in direct contact with the catalyst producing hot flue gas; said cogeneration power plant comprises a gas turbine equipped with an air compressor and a combustor; said integration which comprises drawing off a portion of compressed air from the power plant gas turbine air compressor leaving remainder compressed air; introducing the drawn off compressed air to the combustor-regenerator; mixing the hot flue gas from the combustor-regenerator with the remainder of the compressed air to produce a recombined gas stream and feeding this recombined gas stream to the combustor of the cogeneration gas turbine power plant.

7 Claims, 1 Drawing Sheet

INTEGRATION OF STEAM REFORMING UNIT AND COGENERATION POWER PLANT

BACKGROUND OF THE INVENTION

The invention involves the integration of steam reforming of methane and light hydrocarbons with a cogeneration power plant, resulting in the production of synthesis gas, synthesis gas by-products, power and steam, with an improved thermal efficiency and lower investment and operating costs than a non-integrated process.

Steam reforming of light hydrocarbons, to produce hydrogen and carbon monoxide, as shown in (1), is a widely used commercial process.

$$CH_4 + H_2O \rightarrow CO + 3\, H_2 \quad \Delta H = 206\ kJ/mol \qquad (1)$$

Due to the presence of excess steam, some of the carbon monoxide and steam react simultaneously as indicated by the water gas shift reaction (2).

$$CO + H_2O \rightarrow CO_2 + H_2 \qquad (2)$$

In the refining industry, steam reforming is a major component of most hydrogen production complexes. Approximately 90% of the hydrogen from a hydrogen plant is produced directly by steam reforming. The remaining 10% is produced via the water-gas shift process which requires CO produced in the reformer. Steam reforming is also an integral component in methanol production from natural gas (3) as well as in Fischer Tropsch processes (4)

$$CO + 2\, H_2 \rightarrow CH_3OH \qquad (3)$$

$$CO + 2\, H_2 \rightarrow 1/n\, (CH_2)_n + H_2O \qquad (4)$$

In response to increasing environmental concerns, the demand for hydrogen and methanol are expected to increase, leading to a need for additional steam reforming capacity. Therefore, an integrated process, resulting in improved efficiency and, hence, lower utility costs, is a timely and attractive option.

Steam reforming is traditionally carried out in multitubular fixed bed reactors which are heated on the outside in a furnace, e.g. by burning fuel such as methane and propane, to supply heat for the reaction. Since steam reforming is a highly endothermic reaction, the amount of fuel, the size of the heat transfer surface required and low thermal efficiency make steam reforming in multitubular reactors very expensive. Furthermore, furnace temperatures are very high such that expensive heat-resistant alloys are required in tubular reactors.

In addition, typical multitubular steam reforming reactors operate at a high steam to carbon ratio (S/C) of 4 to 6. A high steam to carbon ratio is needed for optimal reformer conversion of methane and a large amount of excess steam is also needed to suppress coke formation. Therefore, steam production must be factored into the cost. One approach for eliminating the costly heat transfer surfaces is through the use of two communicating fluid beds, either of which could be an upflow or downflow fixed bed, a fast fluid bed or a circulating fluid bed. In such a design, the reforming catalyst is heated directly, via combustion of fuel gas, in one of the fluid beds, and then the hot catalyst is conveyed to the other fluid bed in which the steam reforming reaction is carried out. In this way, the heat gained in the bed in which the combustion is carried out can be transferred directly to the reformer section supplying the required sensible heat and endothermic reaction heat for reaction (1). The recycling of the reforming catalyst to a combustion zone also regenerates the catalyst by burning off any coke formed during the reforming reaction. Since the continuous regeneration eliminates concerns over continuous coke build-up and, hence, permanent catalyst deactivation, lower steam to carbon ratios can be used resulting in further utility savings.

One major obstacle to such a design is the fact that steam reforming is normally carried out under pressure (150–400 psig) and, therefore, the air required for combustion and, hence, catalyst heating, must be compressed to preserve the pressure balance in the catalyst circulation loop. The cost of energy required for this compression is very high and, to some degree, off-sets the improved heat transfer benefits relative to the traditional non-contact heat transfer. A portion of the energy expended to compress the external gases sent to the combustor/regenerator can potentially be recovered by expanding the hot, pressurized gases exiting the combustor/regenerator, after separation from the solids, to a turbine to produce power. The inability of conventional turbines to operate at high temperatures (>1400° F.) with entrained particulates, due to excessive turbine blade erosion, provides a second major process obstacle. Filtration of hot gases is an option only if the flue gas is first cooled to a temperature for which commercial catalyst filters are available. Cooling via some external medium entails a further reduction in the thermal efficiency. At these low temperatures very little net energy is gained in excess of the energy required for compression which leads to a high investment cost and a loss in thermal efficiency.

SUMMARY OF THE INVENTION

It is an object of this invention to eliminate the aforementioned obstacles by integration of a steam reforming process, composed of two communicating fluid beds, with a cogeneration power plant. To achieve this goal, a fluidized bed process unit is integrated with a combined cycle power plant. This integration, in part, involves drawing off a portion of compressed air from a compressed air flow from a gas turbine power plant compressor. This "borrowed" compressed air is introduced into the combustion section of our reformer reactor together with the fuel gas. A small booster compressor for the borrowed air is used to compensate for pressure drop in the combustor. The "borrowed", compressed air and also some extra heat is later returned to the power plant by mixing hot, compressed off gases from the catalyst regenerator with the power plant compressed air flow which is being conveyed to the power plant combustor. The mixing of the hot flue gases and the rest of the compressed air flow lowers the temperature of the off gases sufficiently to allow removal of catalyst fines by filtration, without any thermodynamic losses. At the same time, the temperature and pressure of the air flow to the power plant combustor are increased to facilitate combustion.

Advantageously, the energy efficiency of the proposed fluid bed steam reforming process is increased by eliminating the need for a large air compressor for the combustion section of the steam reforming process, thereby significantly reducing compression costs both in energy and investment. This advantage is achieved by several unexpected synergistic effects due to this combination. The integration not only eliminates the need for a large compressor and turbine, but also allows the utilization of the energy of the hot combustion gases in a thermally efficient way since, by mixing with the excess cold air, one can filter the particulates with no thermodynamic efficiency loss compared to a non-integrated gas turbine. Another advantage is that the need to maintain very low single pass coke production is reduced since the catalyst is continuously regenerated, allowing a reduction in excess steam to the reformer.

Yet another advantage is that combined cycle power plant compression and combustion costs can be reduced through the introduction of hot, compressed gases from the fluidized bed regenerator.

DETAILED DESCRIPTION OF THE INVENTION

Figure 1:
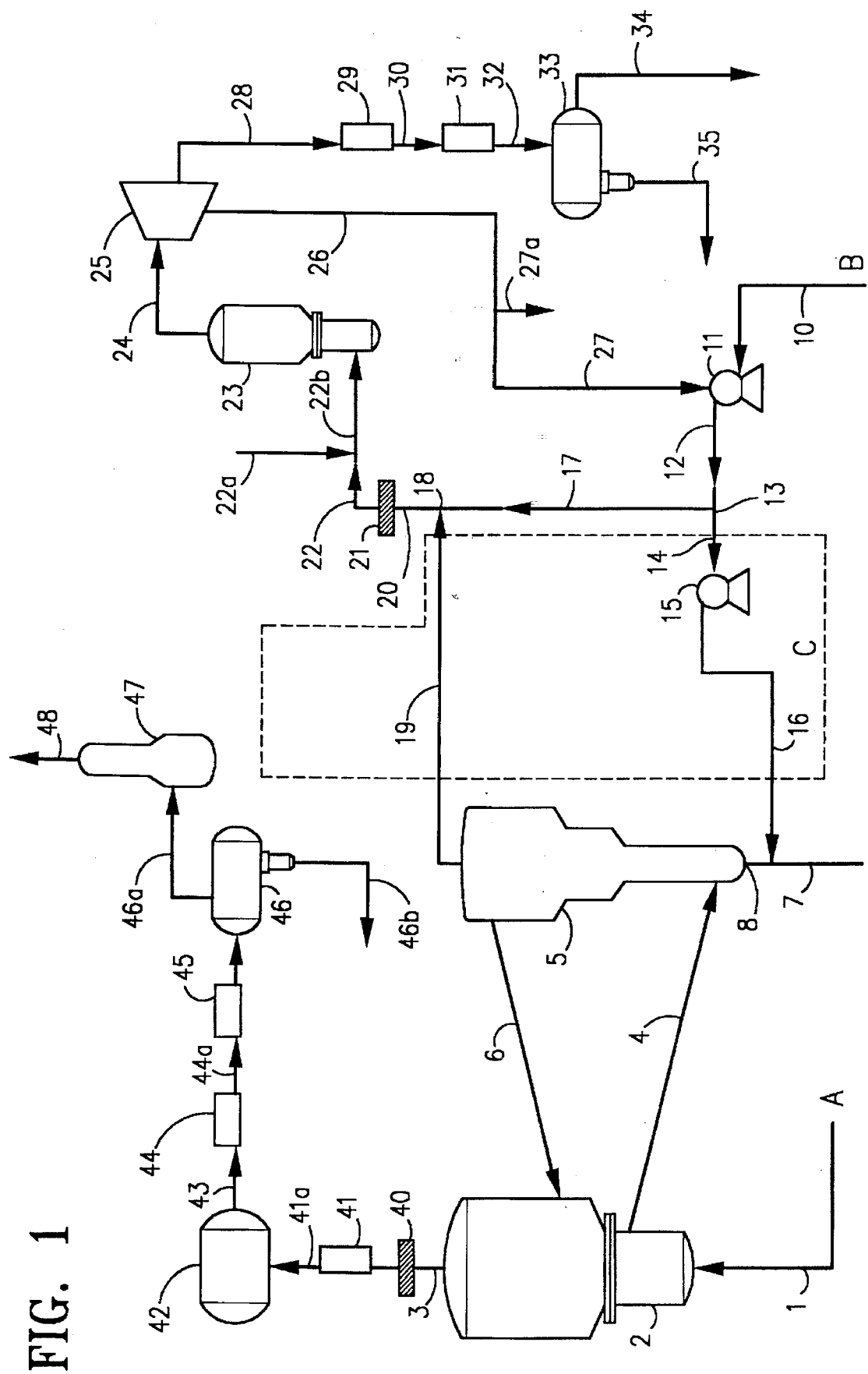
FIG. 1 is a diagrammatic flowsheet of the invention.

In this invention, a steam reforming unit and a cogeneration gas turbine power plant are integrated. The steam reformer is composed of two communicating fluid beds such that the reforming catalyst continuously exits the first fluid bed, the reformer reactor, at a temperature of $T_1$ and, following separation from the reformer gas products, enters a second fluid bed combustor-regenerator at $T_2$, such that $T_2 > T_1$.

The types of fluidized bed processes contemplated for use herein include fast fluid beds, fixed fluid beds and circulating fluid beds. All of these applications can be utilized in either the upflow or downflow modes. A fixed fluid bed is a fluid bed in which the gas velocity is above that required for minimum fluidization but below that necessary to achieve pneumatic transport. The bed surface, although it could be highly irregular, is fairly well defined. Examples of fixed fluid beds include bubbling and turbulent fluid beds. A circulating fluid bed is a fluid bed process whereby catalyst is continuously removed from the bed (whether in upflow or downflow orientation) and is then re-introduced into the bed to replenish the supply of solids. At high velocities (>50 ft/sec) the solid density in the reactors is low, i.e. below 2 lb/ft$^3$, and, in upward flow, one calls this type of fluid bed a riser reactor. At lower velocities, while the catalyst is still entrained in the gas stream, a relatively dense bed is formed in the reactor. This type of bed is often called a fast fluid bed. There is no clear dividing line between these types of reactors and, for the purpose of the invention, it is sufficient that we deal with catalyst particles in such a manner that they can easily flow between the combustion/regeneration and reaction zone.

In the invention, the catalyst exiting the combustor-regenerator at temperature $T_2$ enters the steam reformer reactor, once again, where the heat accumulated in the combustor-regenerator is used to fuel the highly endothermic reforming reaction. Since the forming reaction generally operated at elevated pressures, the combustor-regenerator requires a supply of combustion air at a pressure equal to the reformer operating pressure plus whatever amount of additional pressure is necessary to overcome any pressure drop in the communicating bed loop. Compressed air to the combustor-regenerator is provided by integration with a cogeneration gas turbine power plant.

In a cogeneration power plant, power is generated by burning fuel gas at moderate pressures (e.g., 200–400 psig) to produce hot, pressurized gases which are then expanded and cooled to produce power and steam, respectively. An amount of air far in excess of that stoichiometrically required (150–200%) for combustion of fuel in the power plant combustor, is initially compressed to the desired gas turbine inlet presser (e.g., 200–400 psig). This large excess air is needed to serve as a heat sink in the power plant combustor to moderate the combustion exotherm and maintain the combustor temperature within the constraints set by the associated hardware. Since the compressed air is available in excess, a portion of the compressed air exiting the cogeneration power plant gas turbine compressor is borrowed for use in the combustor/regenerator. The diluent air, previously used to control the temperature in the power plant combustor is replaced by hot, pressurized off gases from the combustor-regenerator which are fed back to the combined cycle power plant and mixed with the remaining airflow as gas flow for the power plant combustor. Such integration reduces the operation and capital costs otherwise associated with a fluid bed steam reforming process.

Entrained solids in the hot off gases from the combustor-regenerator can damage the power plant gas turbine blades as a result of erosion. Therefore, the combustor-regenerator hot off gases are filtered to remove the entrained particulates. The temperature tolerance of commercially available filters for this purpose is limited to e.g., about 1450° F., and the temperature of the hot off gas existing the combustor-regenerator is generally well above this limit. The hot off gases can be sufficiently cooled by mixing with the remainder of the cooler power plant gas turbine compressor air flow. The mixture of hot flue gas and the cooler compressed power plant air flow equilibrate to an acceptable temperature such that the mixed gas stream can be passed through a filter and then sent to the power plant combustor.

Using the integrated fluidized bed steam reformer has additional advantages over the traditionally used multitubular reactors. Ordinary steam reforming requires a large amount of excess steam which is needed to suppress coke formation to extend cycle life in fixed bed steam reforming operations. In the fluidized bed, the need to maintain low single pass coke production is reduced since the catalyst is continuously regenerated in the regenerator.

The steam reforming processes contemplated to be used herein are those which require a pressure above about 100 psi. The preferred pressure range is from about 100 psi to about 1000 psi; more preferably about 150 psi to about 600 psi; and most preferably about 150 psi to about 450 psi. The preferred temperature range of the steam reforming reactor is from about 1350° F. to about 2000° F., most preferably about 1500° F. to 1650° F. Steam reforming typically requires a temperature of about 1600° F. to about 1650° F.

As is known in the art, steam reforming processes generally utilize a nickel catalyst on an alumina support. For use in a fluidized bed, the solid catalyst particle sizes are generally in the range of 2 to 150 microns, preferably with a majority of particles at about 40 to 120 microns, more preferably, about 90 microns. The catalyst is preferably attrition-resistant. The feed for steam reforming is generally a light paraffin, preferably methane or ethane, and steam. The product stream consists of hydrogen, carbon monoxide and carbon dioxide, as well as unreacted steam and hydrocarbon.

The integration of a power plant unit with a steam reforming process unit is exemplified in FIG. 1.

Referring now to the flowsheet in FIG. 1, section A shows a steam reforming process unit. A pressurized, gaseous feedstream for steam reforming, containing steam and methane at a steam/carbon (S/C) ratio, in this example of 4:1, and which can be in a range of about 2:1 to 6:1, for example, 28.25 MMSCFD (million standard cubic feet per day) methane and 113 MMSCFD steam, is introduced through line 1 into reformer reactor 2, which in this example is a fixed fluid bed. The feed inlet temperature is about 500° F. The reformer reactor 2 contains a bed of fluidized, solid, particulate catalyst (not shown) which is at a temperature sufficient to effect steam reforming, in this example, 1650° F. This temperature can be in a range of about 1350° F. to 2000° F., preferably above 1600° F. The pressurized feedstream is introduced into the reformer at a pressure of about 300 psig. The reforming beds can operate at a pressure of about 150 to 450 psig. The steam reforming in the reformer reactor results in an energy requirement of 68.1 MW (megawatts) to produce 100 MMSCFD $H_2$ at 93% $CH_4$ conversion.

A gaseous product effluent containing $H_2$, e.g., about 89.27 MMSCFD; CO, e.g., about 14.41; $CO_2$, e.g., about 11.02; $H_2O$, e.g., about 76.28 and $CH_4$, e.g., about 1.98 (units herein are MMSCFD) exits the reforming reactor through line 3 at a temperature of about 1650° F. or in a range of about 1350° F. to 2000° F. and a pressure of about 300 psig or in a range of about 100 to 1000 psig.

Spent catalyst from the reformer reactor 2 is passed through conduit 4 to the combustor-regenerator 5 for reheating. The catalyst combustor-regenerator generally operates at a temperature higher than the reformer with a heat differential supplied by the burning in the regenerator of light hydrocarbons, such as fuel gas and coke which may have deposited on the catalyst during the steam reforming step. In this example, methane was chosen as the fuel to the combustor-regenerator. The temperature differential of combustor-regenerator over reformer in this example is 150° F. but can be preferably about 20° F. to about 1000° F.; more preferably about 50° F. to about 400° F.; and most preferably about 150° F. to about 200° F. The temperature is related to equipment restrictions. For a given heat requirement in the reforming reactor, the temperature and the circulation rate are related according to the formula $$Q = \dot{\mu} C_p \Delta T$$

Q=heat to be transferred to the reforming reactor (Btu/min)

$\dot{\mu}$=solid flow rate (Btu/min)

$C_p$=heat capacity (Btu/$lb_m$-F°)

$\Delta T$=temperature difference (°F)

In combustor-regenerator 5, a fuel stream comprising fuel mixed with air, in this example containing 9.04 methane, and 20% stoichiometric excess air, and at about 300 psig or in a range of about 100 to 1000 psig and at a temperature of 260° F. or in a range of about 200° F. to 900° F., is introduced into the combustor-regenerator through lines 7 and 16 and the fuel and coke are burned in the combustor/regenerator to generate heat. The catalyst is heated in the combustor-regenerator to a temperature of about 1800° F. or in a range of about 1500° F. to 2200° F. The regenerated catalyst passes out of the combustor/regenerator 5 through conduit 6 and is conveyed back to the reforming reactor 2 propelled by a pressure difference between the reformer reactor and the combustor-regenerator. $P_{comb} > P_{ref}$; $\Delta P \sim 3-100$ psi.

A gaseous product effluent which exits the reformer reactor 2 through line 3 is optionally passed to other downstream components such as a shift reactor 42, steam generator 44, and waste boiler 45, followed by passage through a pressure swing absorber (PSA) 47 to separate the hydrogen product. These other downstream components are further discussed below.

In FIG. 1, section C, the steam reforming process is integrated with a cogeneration gas turbine power plant. A cogeneration power plant unit is shown in FIG. 1, section B.

Referring again to FIG. 1, in the power plant unit in section B, air (about 251.4 MMSCFD at 75° F. and 10 psig) is conveyed through line 10 into the gas turbine compressor 11 which has an energy use in this example of about 24.8 MW. Compressed airflow, 52.83 $O_2$ and 198.60 $N_2$, in this example, at a pressure of about 150 psig and at about 252° F. exits the main compressor through line 12. As shown in FIG. 1, section C, a portion of the compressed airflow in line 12 is diverted at juncture 13 into line 14 for the purpose of "borrowing" air and pressure for integration into the steam reforming process unit. The drawn off portion of air can have a pressure of about 50 to 1000 psig, preferably 150 to 400 psig and a temperature of about 300° to 900° F., preferably about 400° to 700° F. The diverted compressed air in line 14 is conveyed to a booster compressor 15, which has an energy use of, e.g., about 4.2 MW, and the pressure of the diverted compressed air in this case is raised to about 300 psig and a temperature of about 307° F. before it exits the booster compressor through line 16. The air (25.99 $O_2$ and 97.75 $N_2$) in line 16 is introduced into the gaseous fuelstream 7 for the catalyst combustor-regenerator 5. In this way, air and pressure for the steam reforming process unit are obtained from the power plant. Therefore, a separate main compressor is not needed for the steam reforming process unit, only a small booster compressor is used.

Meanwhile, the remainder of the compressed air (about 26.84 $O_2$ and 100.85 $N_2$) in line 12 after juncture 13 is conveyed through line 17 to intersection 18 where hot flue gas in line 19 at about 1800° F. or in a range of about 1500° to 2200° F., preferably about 1650° to 1850° F., and 300 psig or in a range of about 150 to 450 psig, in this example containing 36.44 $CO_2$, 21.75 $H_2O$, 2.54 $O_2$, 97.46 $N_2$ and also containing catalyst fines from the combustor-regenerator 5 is mixed with the compressed air in line 17 to form a mixed, recombined gas stream 20. The hot flue gas in line 19 from the combustor-regenerator 5 contains fine particles which can result from attrition of the fluidized bed catalyst. Attrition normally results from mechanical particle degradation and break up in a fluidized bed. The compressed air in line 17, in this case before mixing is at a temperature of about 252° F. and 150 psig. The mixing which occurs at intersection 18 adjusts the temperature of the resulting mixed, recombined gas stream to about 1200° F., or in the range of about 700° to 1600° F., preferably about 1000° to 1400° F. Thus, the mixture of hot flue gas from the combustor-regenerator and power plant compressed air has a temperature sufficiently lowered to allow passage through conventionally available filters to remove catalyst fines. Conventionally available filters are generally limited to temperatures below 1400° F. In the absence of additional heating or cooling of 17 and 19, setting of a maximum mix temperature dictates the relative sizes of the power plant (i.e., power generated) and the steam reformer (i.e., hydrogen produced).

After the mixing of gas streams at intersection 18, the mixed gas stream is conveyed through filter 21 by line 20. The mixed gas stream emerges from the filter with catalyst fines removed and the mixed stream at a pressure of about 150 psig and a temperature of about 1190° F. is conveyed through line 22 to the power plant combustor 23. Before the mixed gas enters the combustor, fuel for combustion, e.g., about 6.5 MMSCFD methane, at about 250° F. and 150 psig is introduced through line 22a into line 22 to intermix with the mixed gas stream. The intermixed combustion fuel and gas stream in line 22b at temperature of about 1168° F. and a pressure of about 150 psig and containing, e.g., 6.5 $CH_4$, 36.44 $CO_2$, 32.21 $O_2$, 198.60 $N_2$, 21.75 $H_2O$ and preferably containing e.g., 150–200% excess air, is combusted in the combustor 23 at a temperature of about 2000° F. or in a range of about 1700° to 2800° F., preferably about 2000° F. to about 2300° F., producing combustion flue gas containing, e.g., 42.66 $CO_2$, 19.21 $O_2$, 198.60 $N_2$ and 34.47 $H_2O$ at 2000° F. and 150 psig, which is conveyed through line 24 from the combustor to the turbine 25. The inlet temperature of the gas turbine can be in the range of about 1700° to 2800° F., preferably about 2000° to 2400° F. Pressure reduction drives the impeller of the turbine. Pressure energy is converted to velocity energy and used to generate power, e.g. in this case, about 76.6 MW power which exits through line 26. Part of the power is diverted through line 27 to run the gas turbine compressor 11. The remainder of the line 27 power in 27a is used elsewhere, e.g., to supplement a refinery.

Hot gas exiting turbine 25 through line 28, in this case, 42.66 $CO_2$, 19.21 $O_2$, 198.60 $N_2$ and 34.47 $H_2O$, at 1350° F. and 10 psig, is used to produce 71.3 MW in steam generator 29. Gases exiting the steam generator 29 (e.g., 42.66 $CO_2$, 19.21 $O_2$, 198.60 $N_2$ and 34.47 $H_2O$ at about 500° F. and 10 psig) are conveyed through line 30 to waste boiler 31. Gases exiting the waste boiler in line 32 are conveyed to a knock out drum which separates, e.g., 34.47 water in line 35 and 42.66 $CO_2$, 19.21 $O_2$ and 198.60 $N_2$ in line 34 which can be conveyed to a stack.

In an optional embodiment, in the steam reforming process unit in section A, after the gaseous product effluent exits the steam reformer reactor through line 3, the effluent is optionally circulated to a shift reactor 42. Water can be introduced into line 3 to produce steam and thus cool the effluent to an acceptable level for filtration. The effluent is cooled to about 700° F. for high temperature gas shift reaction. The reformer effluent can be also cooled by passing through steam generator 41 to produce about 53.5 MW of steam energy and the temperature of the effluent in line 41a is reduced to about 700° F. The positions of steam generator 41 and filter 40 are reversed if an initial pre-filter cooling mechanism is not employed.

The high temperature gas shift in shift reactor 42 is carried out adiabatically at an inlet temperature of about 700° F. and about 300 psig. Approximately 75% of the carbon monoxide is converted in the shift reactor, as dictated by equilibrium constraints such that the shift reactor effluent 43 contains, e.g., about 100.01 MMSCFD $H_2$, 1.98 methane, 22.04 $CO_2$, 3.67 CO, and 65.54 $H_2O$ at about 812°0 F. and 300 psig. The shift reactor effluent in line 43 can be used to produce about 16.7 MW of steam in steam generator 44 thereby cooling the shift reactor effluent to about 500° F. in line 44a. The line 44a effluent is further cooled to 100° F. in waste boiler 45 and water is removed in knock out drum 46 prior to pressure treatment in the swing absorber (PSA) 47 for hydrogen purification. Hydrogen product is collected through line 48.

In a preferred embodiment, the shift reactor is eliminated and the CO, $CO_2$ and methane by-products from the PSA complex containing, e.g., 1.98 methane, are fed directly to the catalyst combustor-regenerator to serve as additional fuel (not shown). In another embodiment, the shift reactor remains in the hydrogen plant design and, similarly to the preferred embodiment, the by-products from PSA, e.g., about 3.67 CO, 22.04 $CO_2$ and 1.98 methane from the PSA 47 at about 100° F. are sent to the combustor/regenerator following compression to the combustor/regenerator operating pressure (not shown). In both cases, to facilitate reduction in the rate of steam to the reformer, and hence to reduce utility costs, steam can be added to the reformer effluent 3 prior to entering the shift reactor 42. In this way, the steam can serve the dual purpose of cooling the reactor effluent and supplementing whatever reformer steam is in the reformer effluent to maximize conversion in the shift reactor, further reducing utility costs.

In this heat integrated design shown in FIG. 1, hydrogen selectivity is not as important as in a conventional hydrogen plant since hydrogen is a co-product with power from the combined cycle power plant, steam generators and waste boilers.

It is the overall efficiency improvement and capital investment savings associated with the production of power, steam and hydrogen that determine the overall uniqueness of this plant.

Another embodiment includes a subsequent integration with a methanol plant (not shown). Reformer synthesis gas is conveyed to the methanol unit and reacted to produce methanol. The reaction for the production of methanol requires synthesis gas as the feed. The reaction generally utilizes a zinc-chromium oxide catalyst, a temperature of 300° F. to 700° F., a pressure of 500 to 5000 psig. A portion of the power required in the methanol plant can be supplied from the power generated in the cogeneration gas turbine power plant.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

We claim:

1. A process for integration of a steam reforming unit and a cogeneration power plant in which
said steam reforming unit comprises two communicating fluid beds; a first fluid bed comprising a reformer containing catalyst and which is used to react steam and light hydrocarbons at conditions sufficient to produce a mixture comprising synthesis gas hydrogen, carbon monoxide, and carbon dioxide, a second fluid bed comprising a combustor-regenerator which receives spent catalyst from the first fluid bed and which provides heat to heat the catalyst and balance the reaction endotherm by combusting fuel gas in direct contact with the catalyst, also producing hot flue gas;
said cogeneration power plant comprises a gas turbine equipped with an air compressor and a combustor;
said integration which comprises drawing off a portion of compressed air from a compressed air stream from the air compressor of the power plant gas turbine air compressor; introducing the drawn off compressed air to the combustor-regenerator; mixing the hot flue gas from the combustor-regenerator with the remainder of the power plant compressed air stream to produce a recombined gas stream and feeding this recombined gas stream to the combustor of the cogeneration gas turbine power plant.

2. The process of claim 1, wherein either of the two fluid beds is selected from the group consisting of a riser reactor, downflow reactor, circulating fluid bed, fast fluid bed and a fixed fluid bed.

3. The process of claim 2, wherein the integration of the power plant and the steam reforming unit further comprises filtering the recombined gas stream.

4. The process of claim 3, wherein the mixing of the combustor-regenerator hot flue gas and the remainder of the power plant compressed air stream results in a recombined gas stream with a temperature below about 1450° F., suitable for filtration by conventional means.

5. The process of claim 1, wherein the drawn off portion of compressed air has a pressure of about 50 to about 1000 psig and a temperature of about 300° to 900° F.; the combustor-regenerator and reformer fluid beds operate at a pressure of about 100 to 1000 psig, the synthesis gas from the reformer has a temperature of about 1350° F. to about 2000° F.; the hot flue gas from the combustor-regenerator has a temperature of about 1500° to 2200° F.; the recombined gas stream has a temperature of about 700° to 1600° F. and the inlet temperature of the gas turbine is about 1700° to 2800° F.

6. The process of claim 1, wherein the drawn off portion of compressed air has a pressure of about 150 to 400 psig and a temperature of about 400° to 700° F.; the combustor-regenerator and reformer fluid beds operate at a pressure of about 150 to 450 psig; the synthesis gas from the reformer has a temperature of about 1500° F. to 1650° F.; the hot flue gas from the combustor-regenerator has a temperature of about 1650° to 1850° F.; the recombined gas stream has a temperature of about 1000° to 1400° F. and the inlet temperature of the gas turbine is about 2000° to 2400° F.

7. The process of claim 1, wherein the integrated steam reforming unit and cogeneration power plant are further integrated with a methanol plant so that the synthesis gas produced in the reformer is reacted to produce methanol and a portion of power required in the methanol plant is supplied from power generated in the cogeneration gas turbine power plant.

* * * * *